US007012904B2

(12) United States Patent
Taketsugu

(10) Patent No.: US 7,012,904 B2
(45) Date of Patent: Mar. 14, 2006

(54) METHOD FOR CONTROLLING TRANSMISSION CAPACITY AND MOBILE COMMUNICATION SYSTEM

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 09/878,251

(22) Filed: Jun. 12, 2001

(65) Prior Publication Data
US 2001/0050909 A1 Dec. 13, 2001

(30) Foreign Application Priority Data
Jun. 13, 2000 (JP) .............................. 2000-177111

(51) Int. Cl.
*H04Q 7/00* (2006.01)
(52) U.S. Cl. ....................... 370/329; 370/231; 370/356; 455/422.1
(58) Field of Classification Search ................ 370/235, 370/231, 252, 328, 329, 356, 468; 455/422.1; 709/225
See application file for complete search history.

(56) References Cited
U.S. PATENT DOCUMENTS

| 5,905,719 A | | 5/1999 | Arnold et al. | |
|---|---|---|---|---|
| 6,151,628 A | * | 11/2000 | Xu et al. ...................... | 709/225 |
| 6,272,129 B1 | * | 8/2001 | Dynarski et al. ............ | 370/356 |
| 6,487,406 B1 | * | 11/2002 | Chang et al. ............. | 455/422.1 |
| 6,501,732 B1 | * | 12/2002 | Xu et al. ..................... | 370/235 |

FOREIGN PATENT DOCUMENTS

| JP | 63-306744 | 12/1988 |
|---|---|---|
| JP | 9-244975 | 9/1997 |
| WO | WO 99/05830 | 2/1999 |

OTHER PUBLICATIONS

Thyagarajan Nandagopal et al., "Service Differentiation Through End-to-end Rate Control in Low Bandwidth Wireless Packet Networks," University of Illinois at Urbana-Champaign, Coordinated Science Laboratory, 1999, IEEE, pp. 211-220.
Malathi Francis et al., "A Flow Control Framework for ABR Services in Wireless/Wired ATM Networks," Univ. Of Waterloo, Dept. of Elec. & Comp. Eng., 1999, *IEEE*, pp. 1156-1160.

* cited by examiner

*Primary Examiner*—John Pezzlo
*Assistant Examiner*—Donald Mills
(74) *Attorney, Agent, or Firm*—Foley & Lardner LLP

(57) ABSTRACT

A mobile communication system implementing a packet communication by allocating efficiently a transmission capacity to a wired line and a wireless line wherein an practical transmission speed of a data communication between a radio base station 2 and a mobile terminal 1 is measured in every call, a transmission capacity required for transmitting data of the transmission speed at the minimum level is determined as a target transmission capacity and in a relay station 3 and a mobile switching station 4, a permissible transmission capacity with which transmission of data is permitted in the wired line is allowed to decrease in the case where the permissible transmission capacity is larger than the target transmission capacity, while the permissible transmission capacity is allowed to increase in the case where the permissible transmission capacity is smaller than the target transmission capacity, whereby a transmission speed in the wired line is controlled so as to be equal to or less than the permissible transmission capacity.

8 Claims, 4 Drawing Sheets

METHOD FOR CONTROLLING TRANSMISSION CAPACITY AND MOBILE COMMUNICATION SYSTEM

FIELD OF THE INVENTION

The present invention relates to a mobile communication system wherein data communication is implemented in accordance with a packet system, and particularly to a mobile communication system wherein a transmission capacity is allocated efficiently to each call in a data communication in accordance with a packet system.

BACKGROUND OF THE INVENTION

Recently, accesses to Internet by means of a mobile terminal such as cellular phone and a hand-held information appliance through a mobile communication system increase.

In the case where a data communication is performed in order to access to home pages or to transmit and receive emails in a mobile communication system, a system wherein a transmission capacity that has been previously determined in accordance with circuit switching connection is allocated to each call has been heretofore employed.

Referring to FIG. 1, there is shown an example of a conventional mobile communication system for effecting a data communication in accordance with a circuit switching system comprising a mobile terminal 11, a radio base station 12, and a radio communication control unit 13 wherein a connection is established with respect to Internet 20 through a packet switching station (PDSN) 14, and a packet gateway switching station (PDGN) 15.

The mobile terminal 11 is a, user terminal in a mobile communication by the use of a cellular phone or a hand-held information terminal.

The radio base station 12 communicates with the mobile terminal 11 by means of transmission and reception of radio signals.

The radio communication control unit 13 is a control unit for controlling a plurality of radio base stations 12.

The packet switching station 14 is equipment to be connected with a call intending to link to Internet among calls to be connected with the radio communication control unit 13, which has a translating function between a communication switching system and a packet switching system.

The packet gateway switching system 15 is an interconnecting gateway switching station for connecting a data communication in a mobile communication system to Internet.

In case of a data communication through Internet link in a conventional mobile communication system, data is transmitted by means of a communication switching system inside the mobile communication system, then, the system is switched into a packet switching system in a packet switching system 14, and it is linked to Internet 20 in a packet gateway switching station 15.

Data communications such as Internet connections exhibit such characteristics that signals are transmitted and received for a short period of time in a burst mode different from voice communications, and no signal is transmitted and received other than the above-described period of time. In a communication switching system, a fixed band is allocated even during no signal is transmitted and received as same as in the case where signals are transmitted and received in a data communication, so that this means that a transmission capacity allocated is uselessly occupied in the case where no signal is transmitted and received. Accordingly, such situation as described above is a factor for preventing efficient use of a transmission capacity in data communication, and in this respect, improvements are demanded.

In place of such communication switching system, there is a packet system wherein a transmission capacity is efficiently used in data communication.

According to a packet system, a transmission capacity in a network is held in common with a plurality of terminals, so that packets are transmitted on the network in only the case where signals are transmitted and received by the terminals, and no transmission is effected other than the case described above. Therefore, such packet system is a system wherein a transmission capacity maintained by a network is efficiently utilized in accordance with statistical multiplexing effect in a data communication, which has such characteristic that signals are transmitted and received in a burst mode. Hence, utilization of the packet system increases also in a mobile communication system.

In also such packet system, packets transmitted from terminals and the like are restricted by means of an average value or a peak value in order to prevent convergence due to a concentration of the packets.

A mobile communication system involves a wireless line and a wired line wherein data is retransmitted frequently in order to transmit correctly the data, since wireless line exhibits a higher error rate than that of wired line. Furthermore, the lower quality in a wireless line brings about the slower practical data transmission speed. Besides, a larger amount of information for detecting errors and processing retransmission of signals is added to a wireless line than that of a wired line, so that a ratio of transmission capacity that can be utilized actually with respect to a line speed is lower in the wireless line than that of the wired line.

In this connection, since a substantially equal amount of transmission amount has been allocated to a wired line and a wireless line in a conventional mobile communication system, there was either a case where a transmission capacity in the wired line becomes useless in the event when quality in the wireless line becomes poor, or a case where abolishment of data arises in a part linked from the wired line to the wireless line.

SUMMARY OF THE INVENTION

An object of the present invention is to provide a mobile communication system wherein each of transmission capacities is allocated efficiently to a wired line and a wireless line to implement a packet communication.

In order to achieve the above described object, a method for controlling a transmission capacity according to the present invention corresponds to a method for controlling a transmission capacity for allocating efficiently the transmission capacity on a wired line in every call in a data communication wherein the data communication relates to a mobile communication system in which data is transmitted in a wireless line and the wired line in accordance with a packet system, comprising the steps of:

measuring an practical transmission speed of the data on the wireless line in the every call;

determining the transmission capacity that is required for transmitting the data at the transmission speed through the wired line at the minimum level in the every call as a target transmission capacity;

decreasing a permissible transmission capacity in the case where the permissible transmission capacity that is usable for transmission of the data through the wired line and determined in the every call is larger than the target transmission capacity; and increasing the permissible transmission capacity in the case where the permissible transmission capacity is smaller than the target transmission capacity;

whereby a transmission speed of the data in the wired line being controlled so as to be equal to or less than the permissible transmission capacity.

Accordingly, the optimum permissible transmission capacity determined on the basis of an practical transmission speed in a wireless line is allocated to each call so that a transmission capacity can be allocated efficiently to a call in a data communication.

Furthermore, an amount of data in a packet from a wired line is restricted by a permissible transmission capacity based on an practical transmission speed in a wireless line, so that data having a higher speed than a transmission speed in the wireless line does not flow thereinto.

Moreover, since allocation of a transmission capacity is controlled on the basis of an practical transmission speed of data transmitted through a wireless line, processing of the control is not dependent upon a protocol applied to the wireless line.

Another method for controlling a transmission capacity corresponds to a method for controlling a transmission capacity for allocating efficiently the transmission capacity on a wired line in every call in a data communication wherein the data communication relates to a mobile communication system in which data is transmitted in a wireless line and the wired line in accordance with a packet system, comprising the steps of:

measuring an practical transmission speed of the data on the wireless line in the every call;

determining the transmission capacity that is required for transmitting the data at the transmission speed through the wired line at the minimum level in the every call as a target transmission capacity;

decreasing a permissible transmission capacity in the case where a difference between the permissible transmission capacity usable for transmission of the data through the wired line, which is determined in the every call, and the target transmission capacity is smaller than a predetermined first threshold; and increasing the permissible transmission capacity in the case where a difference between the permissible transmission capacity and the target transmission capacity is larger than a predetermined second threshold;

whereby a transmission speed of the data in the wired line being controlled so as to be equal to or less than the permissible transmission capacity.

According to an embodiment of the present invention, the permissible transmission capacity is periodically updated.

A mobile communication system according to the present invention corresponds to a mobile communication system implementing a data communication by transmitting data through a wireless line and a wired line in accordance with a packet system, comprising:

a radio base station wherein an practical transmission speed of the data in the wireless line is measured in every call, a transmission capacity required for transmitting the data of the transmission speed through the wired line at the minimum level is determined as a target transmission capacity in the every call, a transmission capacity demanding signal for decreasing a permissible transmission capacity is transmitted in the case where the permissible transmission capacity usable for transmission of the data through the wired line and determined in the every call is larger than the target transmission capacity, and the transmission capacity demanding signal for increasing a permissible transmission capacity is transmitted in the case where the permissible transmission capacity is smaller than the target transmission capacity;

a relay station wherein the transmission capacity demanding signal is received from said radio base station to change the permissible transmission capacity set up inside the station in the every call to control the transmission speed of the data in the wired line so as to be equal to or less than the permissible capacity and at the same time, to transmit the transmission capacity demanding signal; and a mobile switching station wherein the transmission capacity demanding signal is received from the relay station to change, in the every call, the permissible transmission capacity set up inside the station in the every call to control the transmission speed of the data in the wired line so as to be equal to or less than the permissible transmission capacity.

Another mobile communication system according to the present invention corresponds to a mobile communication system implementing a data communication by transmitting data through a wireless line and a wired line in accordance with a packet system, comprising:

a radio base station wherein an practical transmission speed of the data in the wireless line is measured in every call, a transmission capacity required for transmitting the data of the transmission speed through the wired line at the minimum level is determined as a target transmission capacity in the every call, a transmission capacity demanding signal for decreasing a permissible transmission capacity is transmitted in the case where a difference between the permissible transmission capacity usable for transmission of the data through the wired line, which is determined in the every call, and the target transmission capacity is larger than a predetermined first threshold, and the transmission capacity demanding signal for increasing a permissible transmission capacity is transmitted in the case where a difference between the permissible transmission capacity and the target transmission capacity is smaller than a predetermined second threshold;

a relay station wherein the transmission capacity demanding signal is received from the radio base station to change the permissible transmission capacity set up inside the station in the every call to control the transmission speed of the data in the wired line so as to be equal to or less than the permissible capacity and at the same time, to transmit the transmission capacity demanding signal; and a mobile switching station wherein the transmission capacity demanding signal is received from the relay station to change the permissible transmission capacity set up inside the station in the every call to control the transmission speed of the data in the wired line so as to be equal to or less than the permissible transmission capacity.

According to an embodiment of the present invention, the radio base station measures periodically the transmission speed to determine the permissible transmission capacity, and transmits the transmission capacity demanding signal as occasion demands.

BRIEF DESCRIPTION OF THE DRAWINGS

The present invention will be explained in more detail in conjunction with appended drawings, wherein.

DESCRIPTION OF THE PREFERRED EMBODIMENT

An embodiment of the invention will be described in detail hereinafter by referring to the accompanying drawings.

Figure 1:
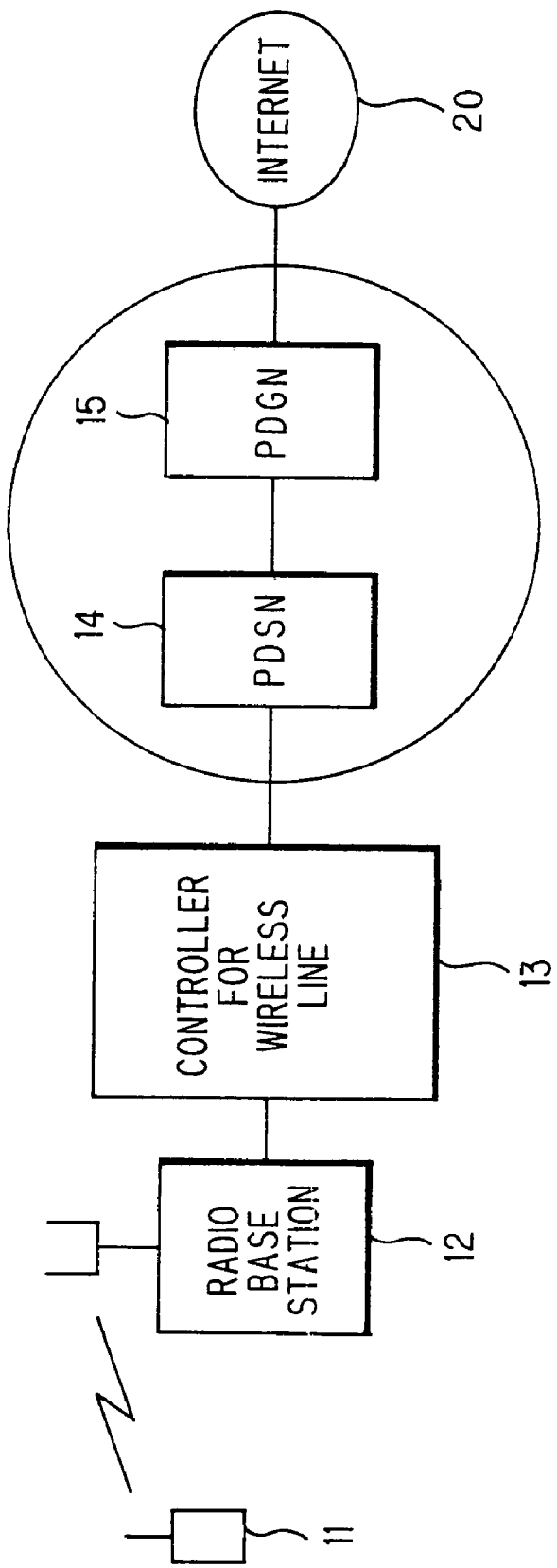
FIG. 1 is a systematic block diagram showing a conventional mobile communication system wherein a data communication is implemented in accordance with a communication switching system.
Figure 2:
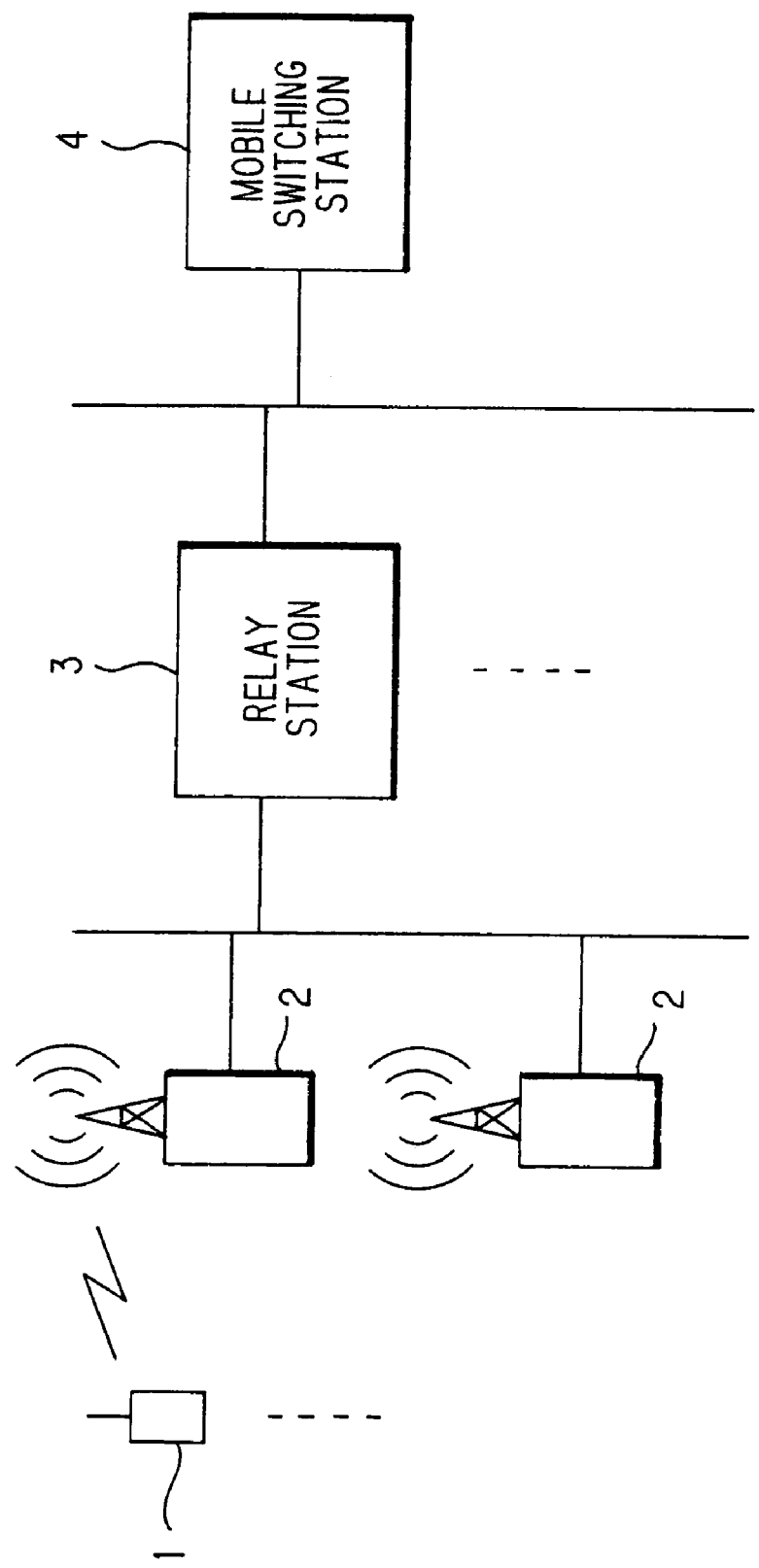
FIG. 2 is a systematic block diagram showing a constitution of a mobile communication system according to an embodiment of the present invention.

Referring to FIG. 2, a mobile communication system according to the embodiment of the present invention comprises a mobile terminal 1, a radio base station 2, a relay station 3, and a mobile switching station 4.

The mobile terminal 1 is a cellular phone or a hand-held information terminal movable over an area covered by the radio base station 2, and which can communicate with the radio base station 2 by means of radio signals. In a data communication, data is transmitted and received in accordance with a packet system wherein packets containing the data are transmitted.

The radio base station 2 communicates with a mobile terminal within an area that is covered thereby by means of radio signals, and terminates a radio interface thereof. In a data communication, data is transmitted and received in accordance with a packet system. In the case when there is a call being in a data communication, the radio base station 2 measures an practical transmission speed in a wireless line established with respect to the mobile terminal 1 in every call, calculates a target transmission capacity that is the optimum transmission capacity for a wired line of the call in the data communication based on the data transmission speed measured, and requests with respect to the relay station 3 to the effect that a permissible transmission capacity, which is permitted for transmission of data in the call at present, is made to coincide with the target transmission capacity. In this case, it is required that a permissible transmission capacity in each call must be a capacity sufficient for transmitting data at the transmission speed obtained by the measurement, and it is desired that such capacity is small as much as possible in order to utilize practically the wired line.

The relay station 3 contains a plurality of radio base stations 2, and relays a data transmission between the radio base stations 2 and the mobile switching station 4 wherein data is transmitted and received in accordance with a packet transmission system in a data communication. When it is requested by a radio base station 2 to change a permissible transmission capacity into its target transmission capacity, the relay station 3 changes a permissible transmission capacity in a corresponding call in a data communication, and at the same time, notifies of the same request to the mobile switching station 4.

The mobile switching station 4 is a switching station constituting a mobile communication network, and contains at least one relay station 3. The mobile switching station 4 connects the relay station 3, another relay station, another mobile switching station, a gateway switching station (not shown) linked to Internet and the like with each other to transmit and receive data. In a data communication, data is transmitted and received in accordance with a packet transmission system. When the mobile switching station 4 receives a request for changing a permissible transmission capacity into its target transmission capacity from the relay station 3, the mobile switching station 4 changes the permissible transmission capacity of a corresponding call in a data communication in accordance with such request.

Figure 3:
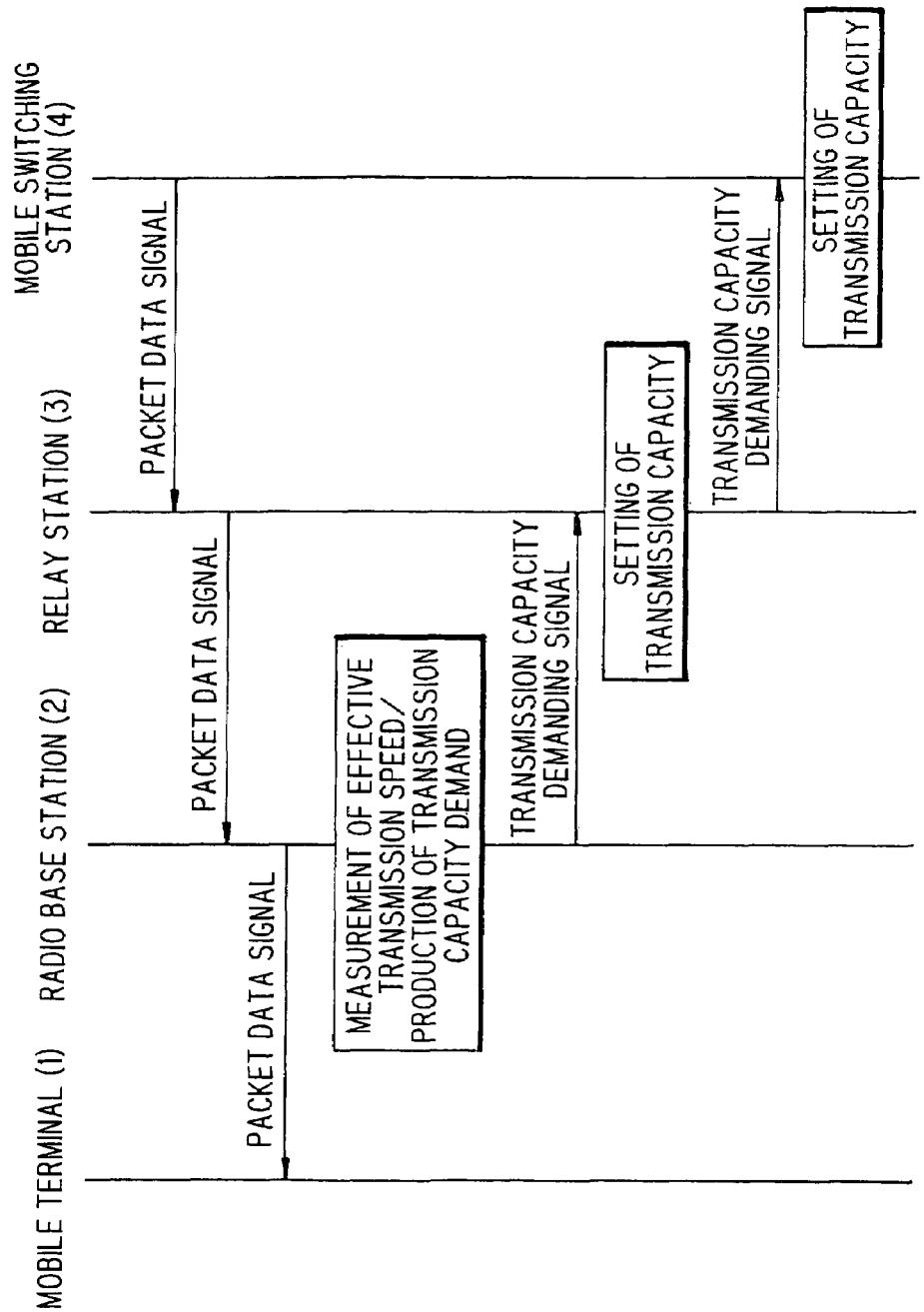
FIG. 3 is a sequential diagram illustrating a sequence in the case when the mobile communication system according to the present embodiment controls a transmission capacity.

FIG. 3 is a sequential diagram illustrating a sequence in the case when a mobile communication system according to the present embodiment controls a transmission capacity. Before applying the sequence, a call is established between a mobile terminal 1 and a device of another party in communication (not shown) through a route composed of a radio base station 2, a relay station 3, and a mobile switching station 4 wherein a data communication is started.

Referring to FIG. 3, packet data signals derived from the device of another party in communication (not shown) are transmitted from the mobile switching station 4 to the relay station 3; the packet data signals thus transmitted are transmitted from the relay station 3 to the radio base station 2, and further transmitted from the radio base station 2 to the mobile terminal 1.

Quality in a wireless line between the radio base station 2 and the mobile terminal 1 varies with time dependent upon movement in the mobile terminal 1, influence of an obstacle, fading and the like. In this respect, there are generally many oases where line quality is inferior in a wireless line to that of a wired line.

Unlike a voice communication, it is requested to transmit data without accompanying any error in a data communication, so that there is a case where data is retransmitted when any error occurs. As a result, there is a case where an practical data transmission speed varies.

An practical transmission speed of a data transmission in a wireless line established between a radio base station 2 and a mobile terminal 1 is measured in the radio base station 2. For instance, an amount of data transmitted within a predetermined time is measured, and it may be determined in accordance with an equation (practical transmission speed) =(amount of data)/(predetermined time). A target transmission capacity in a wired line is determined on the basis of an practical transmission speed in a wireless line; and a transmission capacity demanding signal, which is requested to increase or decrease a permissible transmission capacity as a target based on the target transmission capacity thus determined, is transmitted from the radio base station 2 to the relay station 3.

Then, when the transmission capacity demanding signal is received by the relay station 3, a permissible transmission capacity for restricting transmission of packets is updated in accordance with the demand from the radio base station 2. Then, such transmission capacity demanding signal is transmitted to the mobile switching station 4 from the relay station 3.

A permissible transmission capacity for restricting transmission of packets is updated in the mobile switching station 4 based on the transmission capacity demanding signal.

In the relay station 3 and the mobile-switching station 4, transmission of packets is controlled in such that a data transmission speed of packets in a wired line is limited to the permissible transmission capacity or less.

For instance, these stations are provided with buffers each accumulating tentatively data received, respectively; data thus received are accumulated in these buffers; and thereafter the data are read in response to a permissible transmission capacity to transmit the same, whereby control for transmission of packets can be achieved. On one hand, it is also possible to control a data transmission speed by effecting flow control in apparatuses between which packets are transmitted and received.

Figure 4:
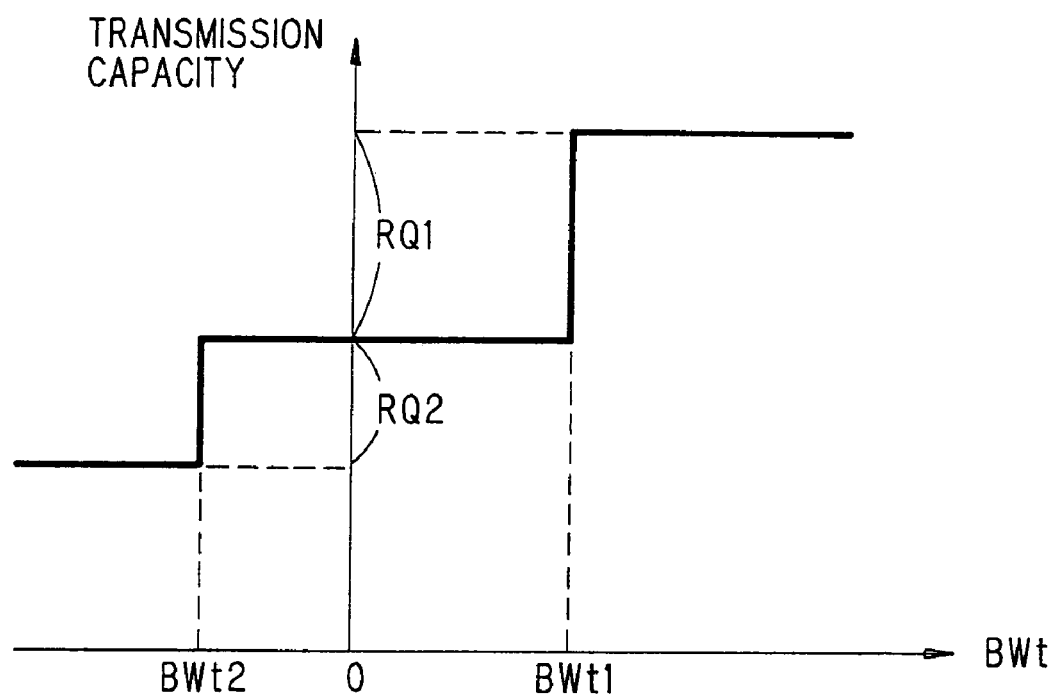
FIG. 4 is an explanatory view for explaining an example of algorithm for calculating a transmission capacity to be demanded with respect to a relay station 3 and a mobile switching station 4 from a radio base station 2 in the present embodiment.

FIG. 4 is an explanatory view for explaining an example of algorithm for calculating a transmission capacity to be demanded with respect to a relay station 3 and a mobile switching station 4 from a radio base station 2 in the present embodiment.

As shown in FIG. 4, a difference BWd (=BWo−BWi) between an practical transmission speed BWo in a wireless line and an practical transmission speed BWi in a wired line is calculated; and when the difference BWd exceeds a predetermined threshold BWt1, a transmission capacity is allowed to increase by RQ1, while when the difference BWd reaches below the predetermined threshold BWt2, the transmission capacity is allowed to decrease by RQ2.

As an practical transmission speed in a wired line, a theoretical value, which is determined from a ratio or the like in a part other than data such as a line speed and a packet header, may be used, or a measured value, which is obtained by measuring an practical transmission speed on a wired line in a radio base station 2, may be employed.

Since an practical transmission speed in a wireless line varies with time, it is desirable to measure periodically such practical transmission speed, and to update a permissible transmission capacity in a wired line.

Therefore, the optimum permissible transmission capacity determined on the basis of an practical transmission speed in a wireless line is allocated to a wired line in each call, so that a transmission capacity in a wired line can be allocated to a call in a data communication, whereby calls in a data communication can be efficiently multiplexed.

Furthermore, an amount of data in a packet that is to be received by a radio base station 2 from a wired line is restricted by a permissible transmission capacity based on an practical transmission speed in a wireless line, so that a buffer overflow due to deterioration of quality in a wireless line is prevented.

Moreover, since allocation of a transmission capacity is controlled on the basis of an practical transmission speed of data transmitted through a wireless line, a transmission speed of data on a wireless line can be matched with that of a wired line irrespective of a protocol applied to the wireless line.

Besides, a transmission capacity demanding signal transmitted from a radio base station 2 or a relay station 3 is transmitted in only the case where a transmission capacity in a wired line is needed to change, so that a decrease in a transmission capacity based on which data can be transmitted that is derived from transmission of such transmission capacity demanding signal is suppressed to the required minimum level.

As a method for controlling a transmission capacity in a data communication in accordance with a packet system, there are a method for controlling an average value of transmission capacities, a method for controlling a peak value of transmission capacities, a method for controlling an average value and a peak value of transmission capacities and the like methods.

According to the present invention, a transmission capacity can be efficiently allocated to a call in a data communication, whereby calls in a data communication can be efficiently multiplexed.

Furthermore, according to the present invention, data at a speed more than a transmission speed in a wireless line does not flow thereinto, so that a buffer overflow due to deterioration of quality in the wireless line is prevented.

Moreover, according to the present invention, a transmission speed of data on a wireless line can be matched with that of a wired line irrespective of a protocol applied to the wireless line.

It will be appreciated by those of ordinary skill in the art that the present invention can be embodied in other specific forms without departing from the spirit or essential characteristics thereof.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for controlling a transmission capacity for allocating efficiently the transmission capacity on a wired line in every call in a data communication wherein said data communication relates to a mobile communication system in which data is transmitted in a wireless link and said wired line in accordance with a packet system, comprising the steps of:

measuring a practical transmission speed of said data on said wireless link in said every call; said practical transmission speed being measured in a radio base station in radio communication with a mobile unit via said wireless link, determining said transmission capacity that is required for transmitting said data at said practical transmission speed through said wired line at the minimum level in said every call as a target transmission capacity;

transmitting a transmission capacity demanding signal from said radio base station to a relay station and from said relay station to a mobile switching station;

in said mobile switching station, in response to said capacity demanding signal, decreasing a permissible transmission capacity of said wired line in the case where said permissible transmission capacity that is usable for transmission of said data through said wired line and determined in said every call is larger than said target transmission capacity; and in said mobile switching station, in response to said capacity demanding signal, increasing the permissible transmission capacity of said wired line in the case where said permissible transmission capacity is smaller than said target transmission capacity;

whereby a transmission speed of said data in said wired line is controlled so as to be equal to or less than said permissible transmission capacity.

2. A method for controlling a transmission capacity for allocating efficiently the transmission capacity on a wired line in every call in a data communication wherein said data communication relates to a mobile communication system in which data is transmitted in a wireless link and said wired line in accordance with a packet system, comprising the steps of:

measuring a practical transmission speed of said data on said wireless link in said every call; said practical transmission speed being measured in a radio base station in radio communication with a mobile unit via said wireless link;

determining said transmission capacity that is required for transmitting said data at said practical transmission speed through said wired line at the minimum level in said every call as a target transmission capacity;

transmitting a transmission capacity demanding signal from said radio base station to a relay station and from said relay station to a mobile switching station;

in said mobile switching station, in response to said capacity demanding signal, decreasing a permissible transmission capacity of said of wired line in the case where a difference between said permissible transmission capacity usable for transmission of said data through said wired line, which is determined in said every call, and said target transmission capacity is smaller than a predetermined first threshold; and in said mobile switching station, in response to said capacity demanding signal, increasing the permissible transmission capacity of said wired line in the case where a difference between said permissible transmission capacity and said target transmission capacity is larger than a predetermined second threshold;

whereby a transmission speed of said data in said wired line is controlled so as to be equal to or less than said permissible transmission capacity.

3. A method for controlling a transmission capacity as claimed in claim 1, wherein:
said permissible transmission capacity is periodically updated.

4. A mobile communication system implementing a data communication by transmitting data through a wireless link and a wired line in accordance with a packet system, wherein:
a practical transmission speed of said data in said wireless link is measured in every call, a transmission capacity required for transmitting said data of the practical transmission speed through said wired line at the minimum level is determined as a target transmission capacity in said every call, a transmission capacity demanding signal for decreasing a permissible transmission capacity of said wired line is transmitted in the case where said permissible transmission capacity usable for transmission of said data through said wired line and determined in said every call is larger than said target transmission capacity, and said transmission capacity demanding signal for increasing a permissible transmission capacity of said wired line is transmitted in the case where the permissible transmission capacity is smaller than said target transmission capacity; said mobile communication system further comprising:

a relay station wherein said transmission capacity demanding signal is received from a radio base station to change said permissible transmission capacity set up inside the base station in said every call to control the transmission speed of said data in said wired line so as to be equal to or less than said permissible capacity and at the same time, to transmit the transmission capacity demanding signal; and a mobile switching station wherein said transmission capacity demanding signal is received from said relay station to change, in said every call, said permissible transmission capacity set up inside the station in said every call to control the transmission speed of said data in said wired line so as to be equal to or less than said permissible transmission capacity.

5. A mobile communication system implementing a data communication by transmitting data through a wireless link and a wired line in accordance with a packet system, wherein:
a practical transmission speed of said data in said wireless link is measured in every call, a transmission capacity required for transmitting said data of the practical transmission speed through said wired line at the minimum level is determined as a target transmission capacity in said every call, a transmission capacity demanding signal for decreasing a permissible transmission capacity of said wired line is transmitted in the case where a difference between said permissible transmission capacity usable for transmission of said data through said wired line, which is determined in said every call, and said target transmission capacity is smaller than a predetermined first threshold, and said transmission capacity demanding signal for increasing a permissible transmission capacity of said wired line is transmitted in the case where a difference between the permissible transmission capacity and said target transmission capacity is larger than a predetermined second threshold; said mobile communication system comprising:

a relay station wherein said transmission capacity demanding signal is received from a radio base station to change said permissible transmission capacity set up inside the station in said every call to control the transmission speed of said data in said wired line so as to be equal to or less than said permissible capacity and at the same time, to transmit the transmission capacity demanding signal; and a mobile switching station wherein said transmission capacity demanding signal is received from said relay station change said permissible transmission capacity set up inside the station in said every call to control the transmission speed of said data in said wired line so as to be equal to or less than said permissible transmission capacity.

6. A mobile communication system as claimed in claim 4, wherein:
said radio base station measures periodically said transmission speed to determine said permissible transmission capacity, and transmits said transmission capacity demanding signal as occasion demands.

7. A method for controlling a transmission capacity as claimed in claim 4, wherein:
said permissible transmission capacity is periodically updated.

8. A mobile communication system as claimed in claim 5, wherein:
said radio base station measures periodically said transmission speed to determine said permissible transmission capacity, and transmits said transmission capacity demanding signal as occasion demands.

* * * * *